Patented Apr. 8, 1941

2,237,459

UNITED STATES PATENT OFFICE 2,237,459

POLYMERIZATION OF OLEFINS

Ralph B. Thompson, Chicago, Ill., assignor to Universal Oil Products Company, Chicago, Ill., a corporation of Delaware No Drawing. Application April 29, 1940, Serial No. 332,239

10 Claims. (Cl. 196—10)

This invention relates particularly to the use of catalytic materials in polymerizing normally gaseous olefinic hydrocarbons to produce normally liquid hydrocarbons boiling within the approximate range of gasoline, although the process may also be employed in other types of polymerizing reactions.

In a more specific sense the invention is concerned with the use as catalyst of a particular type of normally solid material which has specific properties both in regard to its activity in accelerating and directing hydrocarbon polymerizing reactions, in its stability in service, and in its relatively low corrosive properties when employed in ordinary commercial apparatus comprising principally various types of steel.

The type of catalyst hereinafter indicated is especially adapted to promote the controlled polymerization of normally gaseous olefins such as those present in the by-product gases from oil-cracking operations to produce additional yields of high antiknock blending fluids, and therefore the catalyst and process will be described in connection with this particular type of reaction.

In one specific embodiment the present invention comprises a process for converting normally gaseous olefins into normally liquid hydrocarbons of gasoline boiling range which comprises subjecting said normally gaseous olefins under polymerizing conditions of temperature and pressure to contact with a member selected from the group consisting of sulfamic acid and a composite of sulfamic acid with a substantially inert adsorbent.

Olefinic hydrocarbons with which the present invention is concerned occur along with paraffinic or saturated hydrocarbons in commercial hydrocarbon mixtures such as those encountered in the cracking of petroleum, in gas-making processes, and as by-products in various chemical industries. Suitable olefins may be obtained also by catalytic dehydrogenation or pyrolysis of the corresponding paraffin hydrocarbons. In general, olefins are more active chemically than certain other classes of hydrocarbons, and even when under mild catalytic influence they exhibit this reactivity in their pronounced tendency to polymerize and form substances of higher molecular weight.

The process of this invention provides for utilizing more effectively the olefinic constituents of commercial hydrocarbon mixtures, particularly propene and butenes occurring in the gases derived from oil cracking processes to produce valuable derivatives therefrom and it may be applied also to individual olefins produced by special chemical methods or by fractionation of mixtures.

The present process is particularly directed to the production of dimers, trimers, and mixed polymers from propene and butenes, particularly such polymers as boil at temperatures within the approximate range of commercial motor fuel such as, for example, from approximately 100 to 400° F. It has been found that the dimers, some of the trimers, and mixed polymers of propene, the butenes, and pentenes boil within this range; and furthermore, that these compounds have unusually high antiknock values. Polymers of higher molecular weights than dimers and trimers of the heavier mono-olefins indicated are generally of too high boiling point to be used in commercial gasolines. Of the lower boiling and normally gaseous olefins, ethylene is the most resistant to polymerization in the presence of catalysts of the present character. But in the presence of its higher homologs it is possible that certain amounts of mixed polymers are formed.

Sulfamic acid may be prepared by treating urea with fuming sulfuric acid as indicated by the following equation:

$$H_2NCONH_2 + H_2SO_4 + SO_3 \rightarrow 2HOSO_2NH_2 + CO_2$$
Urea                                              Sulfamic acid Sulfamic acid or its composite with a siliceous adsorbent such as diatomaceous earth, clays, both raw and acid-treated, silica gel, crushed porcelain, crushed fire-brick, etc., may be formed into particles by pelleting or pressing of the powdered materials. In the latter case the pressed compact material is crushed and screened to produce particles of desired average size.

Granular and also powdered materials of the present types are characterized by the ability to catalyze the polymerization of olefins to produce relatively low boiling normally liquid polymers rather than heavy tars or pitches, by their long life, and by the substantially low oxidizing tendency of the active catalytic material. In contrast to this, it is notable that when employing sulfuric acid as a polymerizing agent, caution is necessary to prevent oxidation and undesirable side reactions such as ester formation, and that when employing metal halides such as aluminum chloride or zinc chloride, the tendency toward the formation of heavy polymers is so pronounced that it is not possible to produce more than minor amounts of desirable low boiling polymers without the concurrent production of relatively large quantities of heavy hydrocarbonaceous materials.

Furthermore, granular catalysts of the present preferred character, in the substantial absence of moisture, have relatively low corrosive action on steel equipment and possess sufficient structural strength to be used as reactor filling material during relatively long periods of service without undue disintegration and powdering.

Because of the possibility of varying the active ingredient and carriers which go to form such composites containing sulfamic acid, alternatives exist, each of which will have its own particular catalyzing and polymerizing character which will not be exactly equivalent to composites of different composition.

The particles of the above described catalytic material are generally placed in vertical cylindrical reactors or treating towers and the olefin or olefin-containing gas mixture is passed downwardly therethrough at a temperature in the approximate range of 150–350° F. and under a pressure of the approximate order of 100–2000 pounds per square inch when dealing with such hydrocarbon mixtures as a fraction of 3 and 4 carbon atom hydrocarbons obtained incidental to cracking, generally containing approximately 10–30% of the so-called higher olefins comprising essentially propene, isobutene, and normal butenes. When operating upon a butane-butene fraction, sulfamic acid-containing catalysts are effective under conditions favoring the maximum utilization of both isobutene and normal butenes which involves mixed polymerization although polymerization of isobutene may be effected under substantially less severe conditions. Isobutene polymers and mixed polymers formed from gases containing isobutene and normal butene or propene may be hydrogenated to give substantially paraffinic products of high octane number.

The following example of a method of preparing a sulfamic acid catalyst and results obtained in its use, is characteristic but it is introduced with no intention of thereby limiting the broad scope of the invention:

Granular sulfamic acid was formed into 6–10 mesh particles by pressing sulfamic acid powder under a hydraulic press to form thin sheets which were then broken up and screened to give particles of desired mesh size. 107 parts by weight of 6–10 mesh sulfamic acid granules was used as a filler in a vertical steel tube through which a mixture of 40 parts by weight of isobutene and 266 parts by weight of isobutane was passed at 200° F. under a pressure of 1000 pounds per square inch. While the isobutene-isobutane mixture was charged at an hourly rate equal to the volume of the catalyst space, 17 parts by weight of isobutene polymers were produced which consisted chiefly of approximately 80% dimer and 16% trimer with 4% distillation loss.

The present invention and its practical value are evident from the preceding specification and the numerical data introduced in its support, although neither section is intended to be unduly limiting.

I claim as my invention:

1. A process for converting normally gaseous olefins into normally liquid hydrocarbons of gasoline boiling range which comprises subjecting said normally gaseous olefins under polymerizing conditions of temperature and pressure to contact with a member selected from the group consisting of sulfamic acid and a composite of sulfamic acid with a substantially inert adsorbent.

2. A process for converting normally gaseous olefins into normally liquid hydrocarbons of gasoline boiling range which comprises subjecting said normally gaseous olefins at a temperature in the approximate range of 150–350° F. under a pressure within the approximate range of 100–2000 pounds per square inch to contact with a member selected from the group consisting of sulfamic acid and a composite of sulfamic acid with a substantially inert adsorbent.

3. A process for producing high quality gasoline from a normally gaseous olefin-containing hydrocarbon fraction which comprises subjecting said fraction under polymerizing conditions of temperature and pressure to contact with a member selected from the group consisting of sulfamic acid and a composite of sulfamic acid with a substantially inert adsorbent.

4. A process for producing high quality gasoline from a normally gaseous olefin-containing hydrocarbon fraction which comprises subjecting said fraction at a temperature in the approximate range of 150–350° F. under a pressure within the approximate range of 100–2000 pounds per square inch to contact with a member selected from the group consisting of sulfamic acid and a composite of sulfamic acid with a substantially inert adsorbent.

5. A process for converting propene into normally liquid hydrocarbons of gasoline boiling range which comprises subjecting said propene at a temperature in the approximate range of 150–350° F. under a pressure within the approximate range of 100–2000 pounds per square inch to contact with a member selected from the group consisting of sulfamic acid and a composite of sulfamic acid with a substantially inert adsorbent.

6. A process for converting isobutene into normally liquid hydrocarbons of gasoline boiling range which comprises subjecting said isobutene at a temperature in the approximate range of 150–350° F. under a pressure within the approximate range of 100–2000 pounds per square inch to contact with a member selected from the group consisting of sulfamic acid and a composite of sulfamic acid with a substantially inert adsorbent.

7. A process for converting normal butene into normally liquid hydrocarbons of gasoline boiling range which comprises subjecting said normal butene at a temperature in the approximate range of 150–350° F. under a pressure within the approximate range of 100–2000 pounds per square inch to contact with a member selected from the group consisting of sulfamic acid and a composite of sulfamic acid with a substantially inert adsorbent.

8. A process for effecting mixed polymerization of isobutene and normal butene which comprises subjecting a 4-carbon atom hydrocarbon fraction containing both isobutene and normal butene to contact at a temperature in the approximate range of 150–350° F. under a pressure of from approximately 100 to 2000 pounds per square inch with a member selected from the group consisting of sulfamic acid and a composite of sulfamic acid with a substantially inert carrier.

9. A process for effecting mixed polymerization of isobutene and propene which comprises subjecting a normally gaseous hydrocarbon fraction containing both isobutene and propene to contact at a temperature in the approximate range of 150–350° F. under a pressure of from approximately 100 to 2000 pounds per square inch with a member selected from the group consisting of sulfamic acid and a composite of sulfamic acid with a substantially inert carrier.

10. A process for converting isobutene into substantial yields of di-isobutene and tri-isobutene which comprises subjecting said isobutene to contact with formed particles of sulfamic acid at a temperature in the approximate range of 150–350° F. under a pressure of the order of 100–2000 pounds per square inch.

RALPH B. THOMPSON.